(12) United States Patent
McInnis et al.

(10) Patent No.: US 7,361,707 B2
(45) Date of Patent: Apr. 22, 2008

(54) ALLOY BLENDS OF POLYURETHANE AND LATEX RUBBER

(75) Inventors: Edwin L. McInnis, Lincoln University, PA (US); Donald Allan Sandusky, Wilmington, DE (US); Daniel Campos, Lancaster, PA (US)

(73) Assignee: Invista North America S.A.R.L., Wilmington, DE (US)

( * ) Notice: Subject to any disclaimer, the term of this patent is extended or adjusted under 35 U.S.C. 154(b) by 0 days.

(21) Appl. No.: 10/949,381

(22) Filed: Sep. 27, 2004

(65) Prior Publication Data

US 2006/0074190 A1 Apr. 6, 2006

Related U.S. Application Data

(60) Provisional application No. 60/506,665, filed on Sep. 26, 2003.

(51) Int. Cl.
*C09D 107/02* (2006.01)
*C09D 175/14* (2006.01)
*C08L 7/02* (2006.01)
*C08L 75/14* (2006.01)

(52) U.S. Cl. ............... 524/507; 524/501; 525/127; 525/130

(58) Field of Classification Search ............ None
See application file for complete search history.

(56) References Cited

U.S. PATENT DOCUMENTS

| 5,095,066 | A | * | 3/1992 | Meixner et al. | ............ 524/500 |
| 5,580,049 | A | | 12/1996 | Brantley | |
| 6,521,702 | B1 | * | 2/2003 | Weikard et al. | ............ 524/839 |
| 2004/0242763 | A1 | * | 12/2004 | Tielemans et al. | .......... 524/589 |

FOREIGN PATENT DOCUMENTS

| GB | 2350366 | | 3/1994 |
| JP | 54164119 | * | 12/1979 |
| JP | 58183746 | * | 10/1983 |
| JP | 2002188036 | * | 7/2002 |
| WO | WO89/03860 | | 5/1989 |
| WO | WO90/14327 | | 11/1990 |
| WO | WO94/05738 | | 3/1994 |
| WO | WO03/046095 | | 6/2003 |

* cited by examiner

*Primary Examiner*—David J. Buttner

(57) ABSTRACT

Disclosed herein are barrier articles of polyurethane blends or alloys that limit the permeability of gases there through, particularly as used in inflatable sports articles and more particularly as used in soccer balls.

20 Claims, 1 Drawing Sheet

ALLOY BLENDS OF POLYURETHANE AND LATEX RUBBER

CROSS-REFERENCE TO RELATED APPLICATIONS

This application is a Non-Provisional of now abandoned Provisional Application Ser. No. 60/506,665 filed on Sep. 26, 2003 by McINNIS, Edwin L., et al. entitled ALLOY BLENDS OF POLYURETHANE AND LATEX RUBBER, the entire contents of which are incorporated by reference and for which claims priority benefit under Title 35, United States Code § 119(e).

BACKGROUND OF THE INVENTION

1. Field of the Invention

This invention is directed to barrier materials that resist the passage of gases, such as air, particularly as used in inflatable articles.

2. Description of the Related Art

Some materials, especially those used in inflated sports articles, such as soccer balls, volleyballs, and rugby footballs, exhibit undesirable properties such as high air permeability, low resiliency, high hysteresis and unsatisfactory aging characteristics. These undesirable properties are often associated with engineering rubber components, whether made from natural rubbers, synthetic elastomeric materials, or blends thereof. For example, soccer balls made from these materials may require frequent re-inflating which can pose problems to users or merchandisers of such articles.

The high hysteresis of the components used in sports balls is also of concern. During normal use, a sports ball endures significant deformation and reshaping with each impact against a player's foot or the playing surface. This effect has been observed with high-speed photography. As the ball deforms, mechanical energy is dissipated in the form of heat, thereby increasing the rubber core temperature and reducing the resiliency of the ball. This loss of stored mechanical energy can also result in a lower return speed of the sports ball, which in the case of soccer balls would translate into lower "foot speed".

A pending provisional patent application Ser. No. 60/455,674, filed Mar. 18, 2003 and also assigned to DuPont describes a process for making air-inflatable sports balls, particularly tennis balls, from formulations of millable polyurethane (MPU) and rubber. Although not bound by any theory, it is hypothesized that the MPU/rubber mix forms an "alloy" which is instrumental in providing the superior properties, especially barrier properties. Currently, latex rubbers are used for many sports balls because they are relatively inexpensive and have desirable elastic properties. However, they typically exhibit poor barrier properties, which results in greater loss of air in use as well as in storage for articles made therefrom.

Therefore, a desirable goal has been to develop a process that will allow the use of latex rubber (or other latex compositions) for making articles, such as sports balls bladders, bicycle tubes, and the like, having low permeability and other characteristics found in the materials of the aforementioned provisional application.

DETAILED DESCRIPTION OF THE INVENTION

To minimize these performance deficiencies in materials used to limit air permeability, special material formulations have been developed that comprise, preferably, an amorphous polyurethane-based elastomer/rubber alloy. Articles, e.g. inflated sports-balls made of these alloys of polyurethanes and rubbers have surprisingly low air permeability and improved resiliency. This allows increased performance attributes in soccer balls, for one example.

These balls demonstrate significantly decreased air permeability in contrast to the balls with conventional latex rubber bladders or liners as well as the potential for increased resilience. It is expected that a similar improvement would result with other articles such as American footballs, rugby balls, basketballs, volleyballs, bicycle inner-tubes, and in a variety of other applications where engineering rubber components are typically used and the expected properties of the inventive materials would be desirable.

The subject invention capitalizes on the "alloy-forming" characteristics of polyurethanes and other suitable materials when mixed with latex rubber. However, polyurethane does not readily form an aqueous dispersion that would be required for combining with the latex rubber. Therefore it was necessary to develop a properly formulated ionizable mixture to provide an aqueous dispersion of polyurethane (based on either polytetramethylene ether glycol (PTMEG) or polyester-based diols), which would be compatible with the latex rubber. The term "latex rubber" as used herein should be understood to mean an aqueous dispersion of either natural rubber or synthetic rubber/elastomer, whether fully-formed or oligomeric and with the capability to be vulcanized later. The term "latex composition" can encompass latex rubbers as well as aqueous dispersions of suitable elastomeric polymers, such as styrene-butadienes, styrene-isoprenes, polyacrylates and the like.

It has been found that the two dispersions mix well and when the water is allowed to evaporate, films are obtained of the type formed in the thin-film evaporative commercial process currently used to make bladders and the like from latex rubbers. As noted earlier, articles made from a pure latex dispersion will have poor barrier properties, however it is expected that articles made from the mixture of the aqueous dispersions of polyurethane and latex rubber will have superior barrier properties.

Polyurethane dispersions (PUD) for the subject invention are prepared by first providing an extended polyurethane polymer that is then dispersed in water. Unlike conventional PUD, the material of this invention can contain additional groups in the polymer that provide sites of unsaturation. For example, monomers containing vinyl and/or allyl groups that do not aid dispersion, but react with the rubber latex during sulfur vulcanization to produce a chemically bonded alloy are used in combination with PTMEG, polypropylene ether polyol (PPG) and polyester backbones and ionomers in making a PUD. The PUD is preferably made from PTMEG, for example, Terathane®, available from INVISTA S.á r.l., Wilmington, Del. The alloys will comprise 90 to 10% by weight of PUD (dry weight basis) and 10 to 90% by weight of rubber (dry weight basis) and preferably 60 to 40% by weight of PUD (dry weight basis) and 40 to 60% by weight of rubber (dry weight basis). The latex rubber can be made from polyisoprene or polybutadiene and typically contains about 60% solids. Polyisoprene is preferable, and can be either natural or synthetic Other latex compositions can be used as well, such as styrene-butadienes, styrene-isoprenes, polyacrylates and the like.

It has been found that polyester polyol-based amorphous polyurethane reduces permeability and temperature dependence even more than the PTMEG-based materials, but the former do not facilitate the elastic efficiency benefit. A similar result might be expected from a PPG-based PUD. Consequently, the PTMEG-based PUD provides a more coordinated benefit and is preferable for use in this invention. However, a dispersion containing polybutadiene or similar resilient material can be added to the alloy, which mitigates some of the deficiencies found in PUDs that are based on polyester or PPG.

Additionally, it is possible to prepare PUDs based upon polyethylene glycol (PEG) polyols, copolymers of PEG and PTMEG, or copolymers of PEG and PPG and also polybutylene adipate (PBA), per the examples. These systems have the advantage of being readily dispersible in water without the necessity of incorporating ionic groups as required for PTMEG. It should be noted that the type of glycol and the molecular weight of the glycol have an effect on the permeability of the resultant polyurethane or polyester-based dispersions. Typically, the lower the molecular weight of the glycol, the lower the permeability. As such, the permeability of the PUD based on PTMEG is the highest, followed by that based on PEG-PTMEG and with that based on adipate glycol having the lowest permeability.

The alloy can also be made with a blend of a polyester dispersion and a rubber dispersion. The polyester can be made by combining a polyether-based diol or a polyester-based diol with a diacid (instead of a diisocyanate, which would produce a polyurethane). Without being held to any particular theory, it appears that the "soft" segment (polyether-based diol or polyester-based diol) is a stronger factor in determining permeability in the elastomer than the "hard" segment (diisocyanate or diacid).

EXAMPLES

Figure 1:
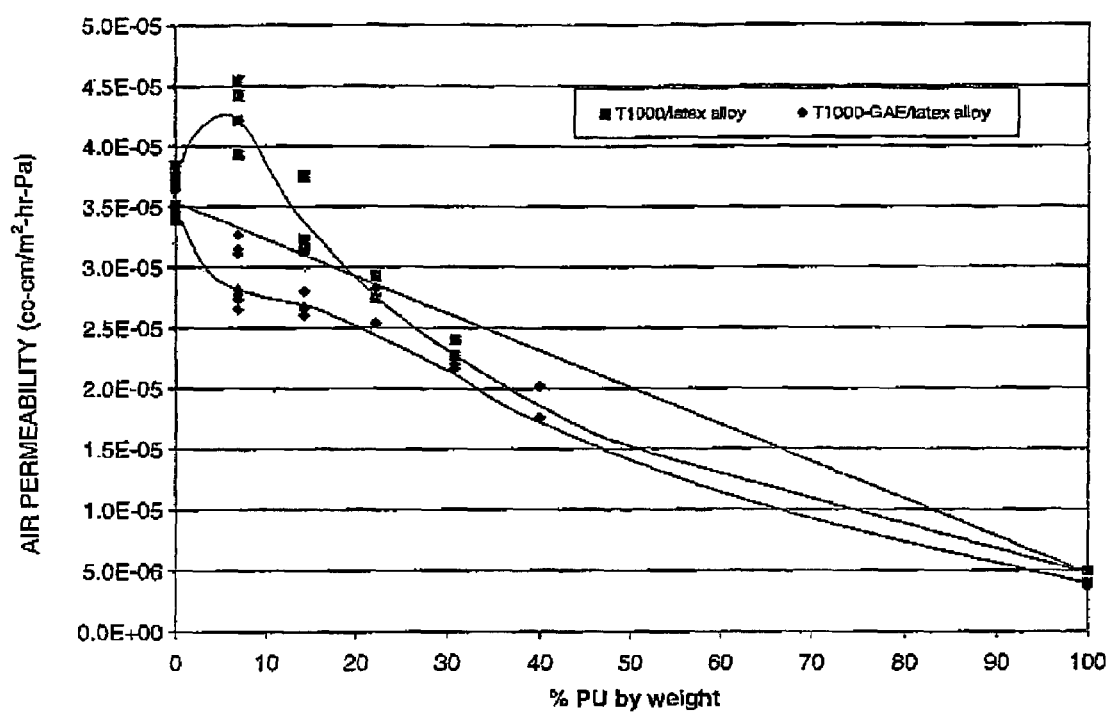
FIG. 1 is a graphical display of the air permeability of films from T1000 polyurethane and latex alloys.

PTMEG-based PUD can be synthesized or obtained commercially from a number of sources. The natural rubbers are typically isoprene materials as used in conventional sports balls and vary slightly in some of the additives they contain.

Polyurethane dispersions were prepared in the usual manner to produce polymer in water systems containing 20-60% solids. These systems can contain various types of dispersing groups (anionic, cationic, and nonionic), diisocyanates (aromatic and aliphatic), and chain extenders (diamines and water). As stated above, PUDs based on PEG polyols and PEG copolymers require little or no supplemental dispersing groups. In a subsequent step, these materials are combined with a latex rubber in varying proportions and processed to make the alloy of the desired composition and properties.

Latex rubbers contain residual unsaturation and can be cured with a number of chemical agents, such as sulfur or peroxides and the reactions are promoted with catalysts, accelerators, and other additives known to those familiar with the art. The latex components are combined in water. The resulting mixture can be used to make a range of dipped and coated materials that are subsequently heated and cured in a process referred to as vulcanization. Alternatively, the latex components are combined and vulcanized prior to the dipping or coating steps.

The latex rubbers can also be vulcanized in the presence of the PUD. Additionally a pre-vulcanized rubber in which the latex is partially cured through the judicious application of heat can be combined with the PUD prior to further heating and full cure.

The following chemical compound abbreviations are used in the examples below:

| Abbreviation | Chemical Name | Manufacturer |
| --- | --- | --- |
| PTMEG | Polytetramethylene ether glycol | INVISTA ™ |
| PPG | Polypropylene glycol | Lyondell |
| PBA | Polybutylene adipate | Crompton |
| PEG | Polyethyleneoxide glycol | DOW |
| PEG-PPG | PEG-PPG copolymer | Dow |
| PEO-PTMEG | PEO-PTMEG copolymer | INVISTA ™ |
| GAE | Glycerol allyl ether | Aldrich |
| MDEA | N-Methyl diethanol amine | Fluka |
| EDA | Ethylene diamaine | Aldrich |
| IPDI | Isophorone diisocyanate | IPDI |

Example 1

Alloys of PTMEG Based Polyurethane-latex

Preparation of Polyurethane Aqueous Dispersions:

A polyurethane aqueous dispersion (PUD) was prepared by mixing 56.0 gm (0.112 eq.) of T1000 (PTMEG, MW=1000 gm/mol) with 36.8 gm (0.331 eq) of IPDI, 4.28 gm (0.064 eq) of dimethylolpropionic acid (DMPA), 2.96 gm (0.045 eq) of glycerol allylether (GAE), and 10 gm of dry n-methylpyrolidone (NMP) in a vessel heated between 50-70° C. under nitrogen. The components were thoroughly mixed for 5-10 minutes and 10 mg of dibutyltin dilaurate were added to initiate the reaction. The compounds were mixed at a temperature of 70-90° C. and reaction progress was monitored by titrating for residual isocyanate content. Residual isocyanate can be measured by ASTM D2572-91 or equivalent. The reaction was terminated when the residual isocyanate fell within 5% (relative) of the theoretical endpoint. As an example, a reaction with a theoretical endpoint of 3.4% would have an acceptable 5 relative percent of the theoretical NCO (e.g., target=3.4% then acceptable end range is 3.4% to 3.7%). Triethylamine (TEA, 3.23 gm, 0.032 eq) was added under dry nitrogen with stirring when the temperature fell below 40° C. No appreciable exotherm was observed. In a separate vessel, ethylene diamine (EDA, 2.82.gm, 0.935 eq) was added to 149 gm of de-ionized water and chilled to 5°-10° C. The TEA-prepolymer reaction was stirred for 30 minutes, and the chilled EDA-water solution was added with vigorous stirring over a period of 5 minutes. It is important to maintain a temperature <30° C. and to not shock the system by adding the EDA-water all at once. The addition produced phase changes and concomitant changes in the agitator torque were required to maintain effective stirring.

The polyurethane dispersion (PUD) became homogeneous and was stirred for an additional hour to insure complete mixing and reaction of the prepolymer. Depending upon the formulation employed, the visual appearance of the dispersion will vary from water-white, to hazy-blue, or milky white. The PUD was discharged and stored until further use. This aqueous dispersion contains 40% solids and is referred to as "T1000-GAE" as it contains a theoretical unsaturation level of 2.0 meq/gm. A 40% solids polyurethane aqueous dispersion was prepared in the same way as described above, with omission of the GAE and is identified as "T1000".

Preparation of Latex Compound:

A latex compound was prepared by mixing a natural latex (Hartex 101) obtained from Firestone Rubber & Latex Co, with a sulfur curing system, and accelerators. Specifically, the compound was prepared as per the following recipe:

| Ingredient | % | description |
|---|---|---|
| Hartex 101 | 91.4 | latex |
| 10% KOH | 2.8 | 10% KOH |
| Darvan WAQ | 0.6 | Darvan WAQ |
| Akrosperse W-9944 | 0.8 | Aq. Dispersion Sulfur (68%) |
| Akrosperse W-9750 | 1.1 | Zinc diethyldithiocarbamate |
| Akrosperse W-9989 | 0.9 | Aq. Dispersion ZnO (60%) |
| Akrosperse W-9924 | 1.1 | Antioxidant 12 |
| Akrosperse W-9753 | 1.2 | Aq. Dispersion Wax (48%) |

The components were mixed and stirred gently for 1 to 2 hours and the mixture was allowed to stand covered for 1 day. The resulting compound is referred to as pre-vulcanized latex compound and contains about 60% solids.

Mixing of Latex Compound and Polyurethane Dispersion and Casting of Films:

Polyurethane dispersions (PUDs) of T1000 with or without GAE were mixed with pre-vulcanized latex compound with varying ratios of PUD to latex compound. The resulting dispersions were stirred gently for 4 hours and then allowed to mature overnight. Films of about 0.7 mm thickness were cast on flat plates and cured at about 104° C. for about 40 minutes and extracted in water at 100° C. and then dried at 60° C. The air permeabilities of the films were measured and the results are shown in Table 1 and also displayed graphically in FIG. 1.

Air Permeability Measurement:

The air permeability is measured at room temperature (25° C.) as follows:

A sample of the flat film of known thickness is clamped in a filter holder device that provides a known filtration area, which was about 9.6 cm$^2$. The feed side of the device is pressurized with air at a given pressure setting and maintained constant. The choice of feed pressure setting was 50 psig (3.45×10$^5$ Pa). The outlet side of the device is maintained at atmospheric pressure.

The volume flowrate of the air that permeates through the film is measured with a sensitive flowmeter.

The air permeability is calculated by the following formula:

$$\frac{(AirFlowrate) \times (Thickness)}{(Area) \times \Delta P} = \text{Air Permeability}$$

Where:

Air permeability=air permeability (cm$^3$-cm/m$^2$-hr-Pa)

Air flowrate=volume flowrate through film sample (cc/hr)

Thickness=film sample thickness (cm)

Area=permeation area in film sample (m$^2$)

$\Delta P$=pressure differential across film (Pa)

Data:

TABLE 1a

T1000/latex alloys

| Sample ID | % PU in alloy | Air permeability (cm$^3$-cm/m$^2$-hr-Pa) @25° C. |
|---|---|---|
| 1A1 | 0.0 | 3.7E−05 |
| 1A2 | 0.0 | 3.5E−05 |
| 1A3 | 0.0 | 3.8E−05 |
| 1A4 | 0.0 | 3.5E−05 |
| 1A5 | 0.0 | 3.8E−05 |
| 1A6 | 0.0 | 3.8E−05 |
| 1A7 | 0.0 | 3.4E−05 |
| 1A8 | 0.0 | 3.7E−05 |
| 1A9 | 0.0 | 3.4E−05 |
| 1B1 | 6.9 | 4.5E−05 |
| 1B2 | 6.9 | 3.9E−05 |
| 1B3 | 6.9 | 3.9E−05 |
| 1B4 | 6.9 | 4.4E−05 |
| 1B5 | 6.9 | 4.2E−05 |
| 1B6 | 6.9 | 4.4E−05 |
| 1B7 | 6.9 | 4.4E−05 |
| 1C1 | 14.3 | 3.8E−05 |
| 1C2 | 14.3 | 3.8E−05 |
| 1C3 | 14.3 | 3.7E−05 |
| 1C4 | 14.3 | 3.2E−05 |
| 1C5 | 14.3 | 3.2E−05 |
| 1C6 | 14.3 | 3.1E−05 |
| 1D1 | 22.2 | 2.9E−05 |
| 1D2 | 22.2 | 2.7E−05 |
| 1E1 | 30.8 | 2.3E−05 |
| 1E2 | 30.8 | 2.4E−05 |
| 1F1 | 100.0 | 3.9E−06 |
| 1F2 | 100.0 | 4.8E−06 |

TABLE 1b

T1000-GAE/latex alloys

| Sample ID | % PU in alloy | Air permeability (cm$^3$-cm/m$^2$-hr-Pa) @25° C. |
|---|---|---|
| 1A1 | 0.0 | 3.7E−05 |
| 1A2 | 0.0 | 3.5E−05 |
| 1A3 | 0.0 | 3.8E−05 |
| 1A4 | 0.0 | 3.5E−05 |
| 1A5 | 0.0 | 3.8E−05 |
| 1A6 | 0.0 | 3.8E−05 |
| 1A7 | 0.0 | 3.4E−05 |
| 1A8 | 0.0 | 3.7E−05 |
| 1A9 | 0.0 | 3.4E−05 |
| 1G1 | 6.9 | 2.8E−05 |
| 1G2 | 6.9 | 3.1E−05 |
| 1G3 | 6.9 | 3.3E−05 |
| 1G4 | 6.9 | 3.1E−05 |
| 1G5 | 6.9 | 2.7E−05 |
| 1G6 | 6.9 | 2.8E−05 |
| 1G7 | 6.9 | 2.8E−05 |
| 1G8 | 6.9 | 2.7E−05 |
| 1H1 | 14.3 | 2.7E−05 |
| 1H2 | 14.3 | 2.8E−05 |
| 1H3 | 14.3 | 2.6E−05 |
| 1H4 | 14.3 | 2.7E−05 |
| 1I1 | 22.2 | 2.8E−05 |
| 1I2 | 22.2 | 2.5E−05 |
| 1J1 | 30.8 | 2.2E−05 |
| 1J2 | 30.8 | 2.2E−05 |
| 1K1 | 40.0 | 2.0E−05 |
| 1K2 | 40.0 | 2.0E−05 |
| 1K3 | 40.0 | 1.8E−05 |
| 1L1 | 100.0 | 3.7E−06 |
| 1L2 | 100.0 | 3.8E−06 |

Discussion:

The data show that:

Increasing the PU content in the PU-latex alloy decreases the air permeability except when the alloy is made with up to about 15% by weight of a PU with PTMEG T1000 with no GAE. The air permeability of a film with 0-15% of PUD prepared from PTMEG T1000 with no GAE is equal to or greater than that of a film made of pure latex. At all PUD levels, alloys containing PUD with GAE have lower permeabilities than non-GAE containing alloys or the pure latex composition.

The air permeability of films made of latex-PTMEG T1000 with no GAE are always higher than that of a film made of pure latex.

Example 2

Alloys of Polyurethane-latex Using Ether or Ester Polyols

Preparation of Polyurethane Aqueous Dispersions:

Polyurethane aqueous dispersions (PUDs) were prepared in a similar fashion as described in Example 1. Typical polyurethane elastomers consist of an amorphous non-crystalline section ("soft block") and a crystalline reinforcing segment (hard block). The type and concentration of hardblock affects the high temperature and modulus properties of the elastomer while the softblock determines the low temperature and flexibility behavior of the polymer. The long chain polyol and short chain glycols (GAE and DMPA) are considered to be components of the soft block and hard block consists of urea links formed from the EDA extension of the isocyanate terminated polyol-glycol mixtures. For the purposes of this experimental design, the long chain polyol was chosen from one of PCL, PBA, PPG or PTMEG. In order to maintain a consistent hardblock level, compositions were adjusted to produce a residual isocyanate content of 4.2-4.5%. Levels of DMPA were varied to maintain an acid number of 18-20%. The molecular weight of the long chain polyol was varied as indicated in the design. Similarly, unsaturation levels were adjusted by varying the GAE level. The unsaturation level is defined as the number of double bonds (referred to as equivalents) per gram of sample. Due to the low level of this unsaturation, units of milliequivalents per gm (meq/gm) are employed in describing the compositions. For all compositions, DMPA was neutralized with one equivalent of triethylamine (TEA), and the isocyanate-terminated prepolymer was chain extended with 0.85 equivalents of ethylene diamine (EDA). The resulting PUDs had a solids content of 40%.

Preparation of Latex Compound:

The latex compound was prepared in the same way as described in Example 1.

Mixing of Latex Compound and Polyurethane Dispersion and Casting of Films and Air Permeability Measurement:

Mixtures were prepared as described in Example 1 resulting in alloys containing 14% by weight of polyurethane (dry weight basis) and the balance of latex compound. Films were cast, and permeabilities were measured, as described previously. The results are listed in Table 2.

Data:

TABLE 2

Air permeabilities of 14% PU/86% latex alloys.

| Sample ID | Polyol | Mw | Unsaturation Level | Air permeability (cc-cm/hr-m$^2$-Pa) @25° C. |
|---|---|---|---|---|
| 2A1 | PBA | 1000 | 0.2 | 3.3E-05 |
| 2A2 | PBA | 1000 | 0.2 | 3.6E-05 |
| 2B1 | PBA | 2000 | 0.2 | 3.5E-05 |
| 2B2 | PBA | 2000 | 0.2 | 3.4E-05 |
| 2B3 | PBA | 2000 | 0.2 | 3.8E-05 |
| 2B4 | PBA | 2000 | 0.2 | 3.6E-05 |
| 2B5 | PBA | 2000 | 0.2 | 3.7E-05 |
| 2B6 | PBA | 2000 | 0.2 | 3.8E-05 |
| 2C1 | PBA | 1000 | 1.1 | 3.3E-05 |
| 2C2 | PBA | 1000 | 1.1 | 3.3E-05 |
| 2C3 | PBA | 1000 | 1.1 | 3.2E-05 |
| 2D1 | PBA | 1500 | 2 | 3.1E-05 |
| 2D2 | PBA | 1500 | 2 | 3.2E-05 |
| 2D3 | PBA | 1500 | 2 | 3.3E-05 |
| 2E1 | PBA | 2000 | 2 | 3.4E-05 |
| 2E2 | PBA | 2000 | 2 | 3.3E-05 |
| 2F1 | PCL | 1000 | 0.2 | 2.6E-05 |
| 2F2 | PCL | 1000 | 0.2 | 2.6E-05 |
| 2F3 | PCL | 1000 | 0.2 | 2.7E-05 |
| 2F4 | PCL | 1000 | 0.2 | 2.6E-05 |
| 2F5 | PCL | 1000 | 0.2 | 2.5E-05 |
| 2G1 | PCL | 1500 | 0.2 | 2.9E-05 |
| 2G2 | PCL | 1500 | 0.2 | 3.2E-05 |
| 2G3 | PCL | 1500 | 0.2 | 3.2E-05 |
| 2H1 | PCL | 2000 | 1.1 | 3.0E-05 |
| 2H2 | PCL | 2000 | 1.1 | 3.0E-05 |
| 2H3 | PCL | 2000 | 1.1 | 3.1E-05 |
| 2H4 | PCL | 2000 | 1.1 | 3.1E-05 |
| 2H5 | PCL | 2000 | 1.1 | 3.3E-05 |
| 2I1 | PCL | 1000 | 2 | 2.7E-05 |
| 2I2 | PCL | 1000 | 2 | 2.5E-05 |
| 2I3 | PCL | 1000 | 2 | 2.8E-05 |
| 2J1 | PCL | 2000 | 2 | 2.6E-05 |
| 2J2 | PCL | 2000 | 2 | 2.6E-05 |
| 2J3 | PCL | 2000 | 2 | 2.6E-05 |
| 2K1 | PPG | 1000 | 0.2 | 2.9E-05 |
| 2K2 | PPG | 1000 | 0.2 | 2.9E-05 |
| 2K3 | PPG | 1000 | 0.2 | 3.0E-05 |
| 2K4 | PPG | 1000 | 0.2 | 2.7E-05 |
| 2K5 | PPG | 1000 | 0.2 | 2.9E-05 |
| 2K6 | PPG | 1000 | 0.2 | 2.9E-05 |
| 2L1 | PPG | 1500 | 1.1 | 3.0E-05 |
| 2L2 | PPG | 1500 | 1.1 | 3.0E-05 |
| 2M1 | PPG | 1000 | 2 | 2.8E-05 |
| 2M2 | PPG | 1000 | 2 | 2.9E-05 |
| 2M3 | PPG | 1000 | 2 | 2.7E-05 |
| 2M4 | PPG | 1000 | 2 | 2.5E-05 |
| 2M5 | PPG | 1000 | 2 | 2.7E-05 |
| 2M6 | PPG | 1000 | 2 | 2.6E-05 |
| 2N1 | PPG | 2000 | 2 | 3.8E-05 |
| 2N2 | PPG | 2000 | 2 | 3.7E-05 |
| 2N3 | PPG | 2000 | 2 | 3.8E-05 |
| 2O1 | PTMEG | 1000 | 0.2 | 4.0E-05 |
| 2O2 | PTMEG | 1000 | 0.2 | 4.0E-05 |
| 2O3 | PTMEG | 1000 | 0.2 | 4.0E-05 |
| 2O4 | PTMEG | 1000 | 0.2 | 3.5E-05 |
| 2O5 | PTMEG | 1000 | 0.2 | 3.9E-05 |
| 2P1 | PTMEG | 2000 | 0.2 | 3.3E-05 |
| 2P2 | PTMEG | 2000 | 0.2 | 3.0E-05 |
| 2P3 | PTMEG | 2000 | 0.2 | 3.4E-05 |
| 2Q1 | PTMEG | 2000 | 2 | 4.8E-05 |
| 2Q2 | PTMEG | 2000 | 2 | 4.1E-05 |
| 2Q3 | PTMEG | 2000 | 2 | 4.7E-05 |
| 2Q4 | PTMEG | 2000 | 2 | 4.6E-05 |

Example 3

Alloys of PTMEG Based Polyurethane-latex. Effect of Latex Prevulcanization

A polyurethane aqueous dispersion (PUD) was prepared as described in Example 1 and referred to as "T1000-GAE". Two alloys of 40% by weight of this PUD were prepared with the latex compound, which was also described in Example 1. In one case (A), the latex compound was allowed to mature to become pre-vulcanized latex compound before mixing it with the PUD. In the other case (B), the latex was not allowed to pre-vulcanize and was immediately mixed with the PUD. In both cases, the PUD-latex mixtures were stirred gently for 4 hours and then allowed to mature overnight. Films of about 0.7 mm thickness were cast on flat plates and cured at about 104° C. for about 40 minutes and extracted in water at 100° C. and then dried at 60° C. The air permeabilities of the films were measured as described in Example 1 and the results are shown in Table 2.

Data:

Alloys of 40% T1000-GAE and pre-vulcanized latex or non-pre-vulcanized latex.

| Sample ID | Description | Air permeability ($cm^3$-cm/$m^2$-hr-Pa) @25° C. |
|---|---|---|
| 3A1 | pre-vulcanized latex | 1.6E−05 |
| 3A2 | pre-vulcanized latex | 1.6E−05 |
| 3A3 | pre-vulcanized latex | 1.6E−05 |
| 3B1 | non-pre-vulcanized latex | 1.5E−05 |
| 3B2 | non-pre-vulcanized latex | 1.6E−05 |
| 3B3 | non-pre-vulcanized latex | 1.6E−05 |

Discussion:

The data show that pre-vulcanizing vs. non-pre-vulcanizing the latex compound prior to mixing with the PUD has no effect on the air permeabilitiy of a PUD-latex alloy film.

Example 4

Alloys of EO-THF Copolymer Based Polyurethane-latex

A polyurethane aqueous dispersion (PUD) was prepared as described in Example 1, except that the PTMEG was replaced by a copolymer of polyethylene-polytetramethylene glycol of 2000 molecular weight and composed of 50% mole of polyethylene oxide and 50% mole of polytetramethylene oxide. This copolymer is referred here to as EO-THF. Mixtures were prepared of the above PUD with a pre-vulcanized latex compound, as described in Example 1.

Films of about 0.7 mm thickness were prepared as described in Example 1.

The air permeabilities of the films were measured as described in Example 1 and the results are shown in Table 4.

TABLE 4

Films of alloys of EO-THF copolymer based polyurethane and pre-vulcanized latex.

| Sample ID | % PU in alloy | Air permeability ($cm^3$-cm/$m^2$-hr-Pa) @25° C. |
|---|---|---|
| 4A1 | 14.3 | 2.4E−05 |
| 4A2 | 14.3 | 2.5E−05 |
| 4A3 | 14.3 | 2.5E−05 |
| 4A4 | 40.0 | 2.1E−05 |

TABLE 4-continued

Films of alloys of EO-THF copolymer based polyurethane and pre-vulcanized latex.

| Sample ID | % PU in alloy | Air permeability ($cm^3$-cm/$m^2$-hr-Pa) @25° C. |
|---|---|---|
| 4A5 | 40.0 | 2.1E−05 |
| 4A6 | 40.0 | 2.1E−05 |

What is claimed is:

1. A formulation comprising an aqueous dispersion; said aqueous dispersion comprising
   an unsaturated polyurethane, at least a portion of which comprises at least one anionic, cationic, allyl, or vinyl group; and
   latex comprising an elastomeric polymer;
   the unsaturated groups of the polyurethane being capable of chemically bonding with the latex; said formulation being formable into a film having an air permeability not greater than $3.5 \times 10^{-5}$ $cm^3$ cm/$m^2$ hour Pa at 25° C. wherein said air permeability is calculated as:

$$\frac{((\text{Flow rate of air in cm}^3/\text{hour}) \times (\text{Thickness of film in cm}))}{\left(\begin{array}{c}(\text{Permeation area of film in m}^2) \times \\ (\text{Pressure differential across film in Pa})\end{array}\right)}$$

wherein a pressure differential of 50 psig is maintained during measurement.

2. The formulation of claim 1, wherein the polyurethane is derived from a polyether glycol.

3. The formulation of claim 1, wherein the polyurethane is derived from a polyester glycol.

4. The formulation of claim 2, wherein the polyether glycol is derived from a polytetramethylene glycol, polypropylene glycol, polyethylene glycol, polyethylene-polytetramethylene copolymer glycol, or polyethylene-polypropylene copolymer glycol.

5. The formulation of claim 3, wherein the polyester glycol is derived from one or more difunctional carboxylic and one or more difunctional hydroxyl compounds.

6. The formulation of claim 1, comprising at least 10% by weight of polyurethane (dry weight basis).

7. The formulation of claim 1, comprising at least 40% by weight of polyurethane (dry weight basis).

8. The formulation of claim 1, wherein the elastomeric polymer is selected from the group consisting of styrene-butadiene, styrene-isoprene and polyacrylates.

9. The formulation of claim 1, wherein the polyurethane is derived from polybutylene adipate.

10. The formulation of claim 1, wherein the unsaturated groups comprise allyl or vinyl.

11. A formulation comprising an aqueous dispersion; said aqueous dispersion comprising
   polyurethane, at least a portion of which has unsaturated groups; and
   latex;
   the unsaturated groups of the polyurethane being capable of chemically bonding with the latex; said formulation being formable into a film having an air permeability not greater than $3.5 \times 10^{-5}$ $cm^3$ cm/$m^2$ hour Pa at 25° C. wherein said air permeability is calculated as:

$$\frac{(\text{Flow rate of air in cm}^3/\text{hour}) \times (\text{Thickness of film in cm})}{(\text{Permeation area of film in m}^2) \times (\text{Pressure differential across film in Pa})}$$

wherein a pressure differential of 50 psig is maintained during measurement; wherein the latex comprises at least one of polyisoprene, polybutadiene and blends of polyisoprene and polybutadiene.

12. The formulation of claim 11, wherein the latex is polyisoprene.

13. The formulation of claim 12, wherein the polyisoprene is natural or synthetic.

14. The formulation of claim 11, wherein the polyurethane is derived from a polyether glycol.

15. The formulation of claim 14, wherein the polyether glycol is derived from a polytetramethylene glycol, polypropylene glycol, polyethylene glycol, polyethylene-polytetramethylene copolymer glycol, or polyethylene-polypropylene copolymer glycol.

16. The formulation of claim 11, comprising at least 10% by weight of polyurethane (dry weight basis).

17. The formulation of claim 11, comprising at least 40% by weight of polyurethane (dry weight basis).

18. The formulation of claim 11, wherein the polyurethane is derived from a polyester glycol.

19. The formulation of claim 18, wherein the polyester glycol is derived from one or more difunctional carboxylic and one or more difunctional hydroxyl compounds.

20. The formulation of claim 11, wherein the polyurethane is derived from polybutylene adipate.

* * * * *